(12) United States Patent
Kato (10) Patent No.: US 11,059,126 B2
(45) Date of Patent: Jul. 13, 2021

(54) WELDING METHOD USING AN END TAB HAVING A CUTOUT

(71) Applicant: Mitsubishi Heavy Industries Engineering, Ltd., Yokohama (JP)

(72) Inventor: Yoshinori Kato, Tokyo (JP)

(73) Assignee: MITSUBISHI HEAVY INDUSTRIES ENGINEERING, LTD., Yokohama (JP)

(*) Notice: Subject to any disclaimer, the term of this patent is extended or adjusted under 35 U.S.C. 154(b) by 124 days.

(21) Appl. No.: 16/678,308

(22) Filed: Nov. 8, 2019

(65) Prior Publication Data

US 2020/0070277 A1 Mar. 5, 2020

Related U.S. Application Data

(62) Division of application No. 15/506,494, filed as application No. PCT/JP2015/072842 on Aug. 12, 2015, now abandoned.

(30) Foreign Application Priority Data

Aug. 28, 2014 (JP) .............................. JP2014-173991

(51) Int. Cl.
*B23K 20/12* (2006.01)
*B23K 20/233* (2006.01)
(Continued)

(52) U.S. Cl.
CPC ........ *B23K 20/1255* (2013.01); *B23K 20/123* (2013.01); *B23K 20/1245* (2013.01);
(Continued)

(58) Field of Classification Search
CPC .......................................... B23K 20/122–128
See application file for complete search history.

(56) References Cited

U.S. PATENT DOCUMENTS

| 4,592,116 A | 6/1986 | Christensen |
| 5,304,978 A | 4/1994 | Cummins et al. |

(Continued)

FOREIGN PATENT DOCUMENTS

| CN | 1192849 C | 3/2005 |
| JP | H10-071477 A | 3/1998 |

(Continued)

OTHER PUBLICATIONS

PCT/ISA/210, "International Search Report for International Application No. PCT/JP2015/072842," dated Nov. 17, 2015.

(Continued)

*Primary Examiner* — Erin B Saad
*Assistant Examiner* — Carlos J Gamino
(74) *Attorney, Agent, or Firm* — Manabu Kanesaka; Benjamin Hauptman; Kenneth Berner (57) ABSTRACT

A production method of a joint material includes a tab installation step of installing an end tab on a pair of workpieces to be joined at a joining line therebetween by friction stir welding, a tool installation step of installing a probe of a tool for friction stir welding at a cutout portion; an approach step of moving the tool while rotating itself from an opening into the cutout portion; a waiting step of causing the tool for friction stir welding to standby in the cutout portion at an extension line; and a joining step of starting movement of the tool along the joining line at a time at which a temperature of the workpieces at a joining portion in front of the tool in an advancing direction of the tool in the waiting step is a predetermined temperature or more and joining the workpieces with each other.

3 Claims, 6 Drawing Sheets

(51) Int. Cl.
  *B23K 103/10* (2006.01)
  *B23K 101/18* (2006.01)
(52) U.S. Cl.
  CPC ...... *B23K 20/2336* (2013.01); *B23K 2101/18* (2018.08); *B23K 2103/10* (2018.08)

(56) References Cited

U.S. PATENT DOCUMENTS

| | | | |
|---|---|---|---|
| 5,794,835 A * | 8/1998 | Colligan | B23C 5/22 228/2.1 |
| 6,193,137 B1 * | 2/2001 | Ezumi | B23K 20/122 228/112.1 |
| 6,352,193 B1 | 3/2002 | Bellino et al. | |
| 6,715,664 B2 * | 4/2004 | Yamashita | B23K 20/124 228/112.1 |
| 7,556,187 B2 * | 7/2009 | Sunahara | B23K 20/124 228/2.1 |
| 9,566,661 B2 | 2/2017 | Seo et al. | |
| 9,931,711 B2 | 4/2018 | Fukuda et al. | |
| 2003/0098335 A1 * | 5/2003 | Saeki | B23K 20/24 228/112.1 |
| 2003/0098336 A1 | 5/2003 | Yamashita | |
| 2004/0084506 A1 | 5/2004 | Tanaka et al. | |
| 2008/0237959 A1 | 10/2008 | Tseng | |
| 2010/0096438 A1 | 4/2010 | Sato et al. | |
| 2012/0181324 A1 | 7/2012 | Yamauchi et al. | |
| 2012/0227890 A1 | 9/2012 | Yamauchi et al. | |
| 2014/0004375 A1 * | 1/2014 | Yamauchi | B23K 20/124 428/615 |
| 2014/0166731 A1 | 6/2014 | Seo et al. | |
| 2015/0240970 A1 | 8/2015 | Eller et al. | |
| 2015/0273623 A1 * | 10/2015 | Kato | B23K 20/125 228/112.1 |
| 2015/0273637 A1 * | 10/2015 | Hori | B23P 15/26 29/890.03 |
| 2018/0207746 A1 * | 7/2018 | Yamaguchi | B23K 20/124 |

FOREIGN PATENT DOCUMENTS

| | | |
|---|---|---|
| JP | 2003-094174 A | 4/2003 |
| JP | 2004-154798 A | 6/2004 |
| JP | 2004-243375 A | 9/2004 |
| JP | 2006-021217 A | 1/2006 |
| JP | 2007-030017 A | 2/2007 |
| JP | 2008-260068 A | 10/2008 |
| JP | 2009-101423 A | 5/2009 |
| JP | 2011-000606 A | 1/2011 |
| JP | 2012-040584 A | 3/2012 |
| JP | 4982513 B2 | 7/2012 |
| JP | 2012-245542 A | 12/2012 |

OTHER PUBLICATIONS

PCT/ISA/237, "Written Opinion of the International Searching Authority for International Application No. PCT/JP2015/072842," dated Nov. 17, 2015.
U.S.P.T.O., "Office Action for U.S. Appl. No. 15/506,494," dated Oct. 17, 2018.
U.S.P.T.O., "Office Action for U.S. Appl. No. 15/506,494," dated Feb. 21, 2019.
U.S.P.T.O., "Office Action for U.S. Appl. No. 15/506,494," dated Aug. 21, 2019.

* cited by examiner

FIG. 13

WELDING METHOD USING AN END TAB HAVING A CUTOUT

CROSS-REFERENCE TO RELATED APPLICATION

This is a devisional application of Ser. No. 15/506,494 filed on Feb. 24, 2017, which claims priority of Japanese Patent Application No. 2014-173991, filed Aug. 28, 2014, the content of which is incorporated herein by reference.

TECHNICAL FIELD

The present invention relates to an end tab used when a workpiece is joined by friction stir welding and a production method of a joint material using friction stir welding.

BACKGROUND ART

As one of methods of joining a workpiece made of two members, friction stir welding is known.

Friction stir welding is a joining method in which a workpiece is joined using frictional heat generated at a surface of the workpiece by rotating a tool in a state in which a joining portion of the workpiece is pressed against a shoulder surface of the tool.

Incidentally, when friction stir welding is performed when a temperature of a joining portion of a workpiece does not reach a temperature appropriate for joining, there is a problem that joining defects are generated.

Patent Document 1 describes a method in which joining is started from a position shifted from a joining line of a workpiece. In this method, a tool is moved at a position shifted from a joining line until a temperature of a workpiece reaches a predetermined temperature appropriate for friction stir welding so that occurrence of joining defects is suppressed and thus joining is appropriately performed.

CITATION LIST

Patent Literature

[Patent Document 1]
Japanese Unexamined Patent Application, First Publication No. 2011-606

SUMMARY OF INVENTION

Technical Problem

When a joining method disclosed in Patent Document 1 is used, that is, when joining is performed from a position shifted from a joining line, there is a problem that it is significantly difficult to control a position of a tool and a tool cannot be moved at a predetermined position. Furthermore, if a workpiece is a hollow shape, a rib of the hollow shape may interfere with movement of the tool. Thus, it is more difficult to start joining from the position shifted from the joining line. Furthermore, if the rib is cut, there is a problem that a strength of the hollow shape is decreased at the cut position.

The present invention is for the purpose of providing an end tab capable of allowing friction stir welding to be performed using a simple method while occurrence of joining defects at a joining start end is suppressed and a production method of a joint material using friction stir welding.

Solution to Problem

In order to solve the above-described problems, the present invention adopts the following means.

An end tab for friction stir welding according to a first aspect of the present invention is arranged to abut against an end surface of a workpiece joined by friction stir welding, and is formed with a cutout portion of which a distal end side is positioned on an extension line of a joining line in the workpiece.

Friction stir welding is performed using such an end tab so that a tool used for friction stir welding can stand by at a position at a distal end side of a cutout portion (an abutting portion of the cutout portion) formed in the end tab. The distal end side of the cutout portion is positioned on an extension line of a joining line. Thus, if the tool stands by at the position at the distal end side of the cutout portion, the tool is held in front of the joining line. Therefore, heat from the tool can be transferred to a workpiece before joining due to the standby of the tool, and thus a temperature of the workpiece on a joining line in front of the tool in an advancing direction of the tool can be effectively increased to a predetermined temperature. As a result, occurrence of joining defects can be suppressed at a time of joining. Furthermore, the cutout portion is formed so that movement of the tool can be restricted by the cutout portion. Thus, the tool can be caused to standby stably in front of the joining line.

In the end tab for friction stir welding according to a second aspect of the present invention, a crossing portion extending in a direction crossing the joining line may be formed in the cutout portion in the first aspect.

As described above, the crossing portion is formed in the cutout portion so that, when a portion of the workpiece softened due to rotation of the tool at the time of friction stir welding goes round at a joining start end (an initially joined portion) behind the tool, the softened workpiece is blocked by the crossing portion. Thus, the softened workpiece can be prevented from being discharged and thus occurrence of joining defects at a joining start end can be suppressed.

A production method of a joint material according to a third aspect of the present invention includes: a tab installation step of installing an end tab, in which a cutout portion of which a distal end side is positioned on an extension line of a joining line in a workpiece joined by friction stir welding is formed, to abut against an end surface of the workpiece; a tool installation step of installing a probe of a tool for friction stir welding at the cutout portion; an approach step of moving the tool toward the distal end side along the cutout portion; a waiting step of causing the tool for friction stir welding to standby at the distal end side of the cutout portion; and a joining step of starting movement of the tool at a time at which a temperature of the workpiece at a joining portion in front of the tool in an advancing direction of the tool in the waiting step is a predetermined temperature or more and joining the workpiece.

According to the production method of the joint material described above, when the workpiece is joined using the end tab in which the cutout portion is formed, the tool is allowed to standby at the distal end side of the cutout portion so that the tool is held in front of the joining line. Therefore, heat from the tool is transferred to the workpiece due to the standby of the tool, and thus a temperature of the workpiece on the joining line can be effectively increased to a predetermined temperature. Furthermore, the joining step is performed in this state so that the joint material can be produced while occurrence of joining defects is suppressed at the time of joining. Also, the cutout portion is formed in the end tab so that movement of the tool can be regulated by the cutout portion. For this reason, the tool can stably standby in front of the joining line.

A production method of a joint material according to a fourth aspect of the present invention includes: a cutout step of forming a cutout portion in an end surface of the workpiece on a joining line of the workpiece joined by friction stir welding; a tool installation step of installing a probe of a tool for friction stir welding at the cutout portion; a waiting step of causing the tool to standby at the distal end side of the cutout portion; and a joining step of starting movement of the tool at a time at which a temperature of the workpiece at a joining portion in front of the tool in an advancing direction of the tool in the waiting step is a predetermined temperature or more and joining the workpiece.

According to the production method of the joint material described above, the cutout portion is formed in the workpiece and the tool is allowed to standby at the distal end side of the cutout portion so that the tool is held at the start end position of the joining line (the joining start end). Therefore, heat is transferred to the workpiece from the tool due to the standby of the tool, and thus the temperature of the workpiece on the joining line can be effectively increased to a predetermined temperature. Furthermore, the joining step is performed in this state so that the joint material can be produced while occurrence of joining defects is suppressed at the time of joining. The cutout portion is formed in the workpiece so that movement of the tool can be regulated by the cutout portion. For this reason, the tool is allowed to stably stand by in front of the joining line. The tool is allowed to standby at the cutout portion formed in the workpiece so that a contact area between a surface of the workpiece and the tool can be increased during the standby of the tool. Thus, an amount of heat input from the tool to the workpiece can be increased. As a result, a temperature rise of the workpiece can be quickened, a standby time of the tool can be shortened, and thus production efficiency of the joint material can be improved.

In the production of the joint material according to a fifth aspect of the present invention, in the joining step in the third or fourth aspect, as the predetermined temperature, the tool starts to move at a time at which a temperature of the workpiece is a temperature greater than or equal to 0.45 times and less than or equal to 0.8 times of a melting point of the workpiece, and the workpiece may be joined.

As described above, the joining step is performed at the time at which the workpiece has a temperature of 0.45 times or more and 0.8 times or less the melting point thereof so that the joint material can be produced while occurrence of joining defects is further suppressed.

In the production of the joint material according to a sixth aspect of the present invention, as the tool in any one of the third to fifth aspects, a bobbin tool configured to perform joining such that the workpiece is sandwiched using a first shoulder and a second shoulder from both surfaces may be used, and the production method of the joint material may further include: a chamfering step of forming a chamfered portion in an end edge of at least one of the first shoulder side and the second shoulder side on the end surface of the workpiece before the joining step.

As described above, the chamfered portion is formed in the workpiece so that a first shoulder (or a second shoulder) of a bobbin tool can move by sliding on the chamfered portion without being caught by the end surface of the workpiece. Thus, the joining using the bobbin tool can be easily performed, and occurrence of joining defects at the workpiece end surface due to the catching of the bobbin tool can be suppressed.

Advantageous Effects of Invention

According to the end tab for friction stir welding and the production method of the joint material using the friction stir welding which have been described above, friction stir welding can be performed using a simple method while occurrence of joining defects at a joining start end is suppressed.

DESCRIPTION OF EMBODIMENTS

First Embodiment

Hereinafter, a production method of a joint material 1 of a first embodiment related to the present invention will be described.

Figure 1A:
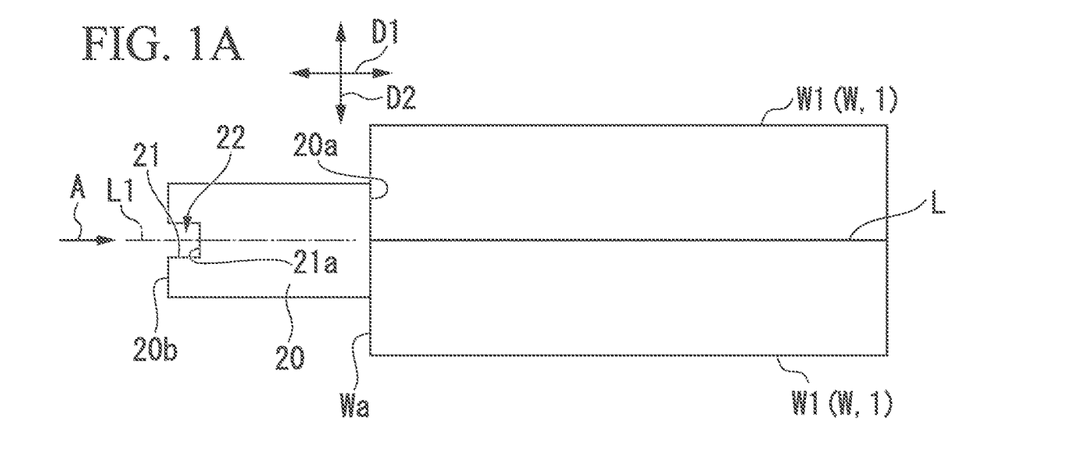
FIG. 1A is a top view showing a state in which an end tab used for a production method of a joint material according to a first embodiment of the present invention is installed at a workpiece.

As shown in FIG. 1A, an end tab 20 used for this embodiment abuts against and is installed at an end surface Wa of a workpiece W obtained when two plates W1 (or hollow shapes or the like) abut against each other in a direction in which a joining line L serving as an abutting line extends.

Generally, the end tab 20 is an auxiliary plate used for suppressing occurrence of joining defects at a joining start end. One joint material 1 is produced by moving a rotating tool 10 for friction stir welding from the end tab 20 toward the joining line L of the workpiece W and joining the two plates W1.

Figure 1B:
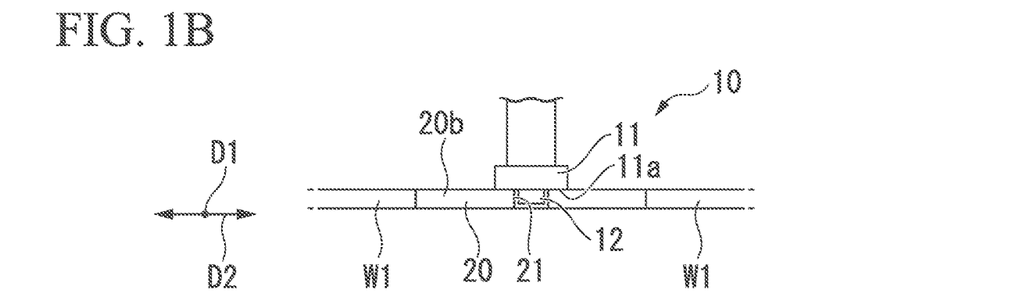
FIG. 1B is a front view showing a state in which the end tab used for the production method of the joint material according to the first embodiment of the present invention is installed at the workpiece, the view taken in a direction of an arrow A of FIG. 1A.

As shown in FIG. 1B, the rotating tool 10 for friction stir welding has a cylindrical shoulder 11 having a shoulder surface 11*a* coming into contact with a surface (an upper surface in this embodiment) of the end tab 20 and a cylindrical probe 12 extending downward from the shoulder surface 11*a*.

A surface of the workpiece W is pressed against the shoulder surface 11*a*, frictional heat is caused to occur, and the workpiece W is stirred using a probe 12. Thus, a plastic flow of a material of the workpiece W is caused to occur so that the workpiece W is joined.

Hereinafter, a direction in which the joining line L extends is referred to as an advancing direction D1, and a width direction of the workpiece W perpendicular to the advancing direction D1 is simply referred to as a width direction D2.

A cutout portion 21 of which a distal end side 22 is positioned on an extension line L1 of the joining line L in the workpiece W is formed in the end tab 20.

The cutout portion 21 extends up to a middle position of the end tab 20 from a second end surface 20*b* at a side away from a first end surface 20*a* abutting against the end surface Wa of the workpiece W in the end tab 20 toward the first end surface 20*a* on the extension line L1. Furthermore, the cutout portion 21 has a rectangular shape symmetrical in the width direction D2 about the extension line L1.

In other words, the cutout portion 21 is formed on the extension line L1, and the distal end side 22 (a bottom 21*a* of the cutout portion 21) of the cutout portion 21 is positioned on the extension line L1.

A size of the cutout portion 21 is slightly larger than an outer diameter of the probe 12 to an extent to which the probe 12 does not come into contact with an inner surface of the cutout portion 21 when a probe 12 is inserted from a vertical direction perpendicular to the advancing direction D1 and the width direction D2 into the cutout portion 21.

Figure 2:
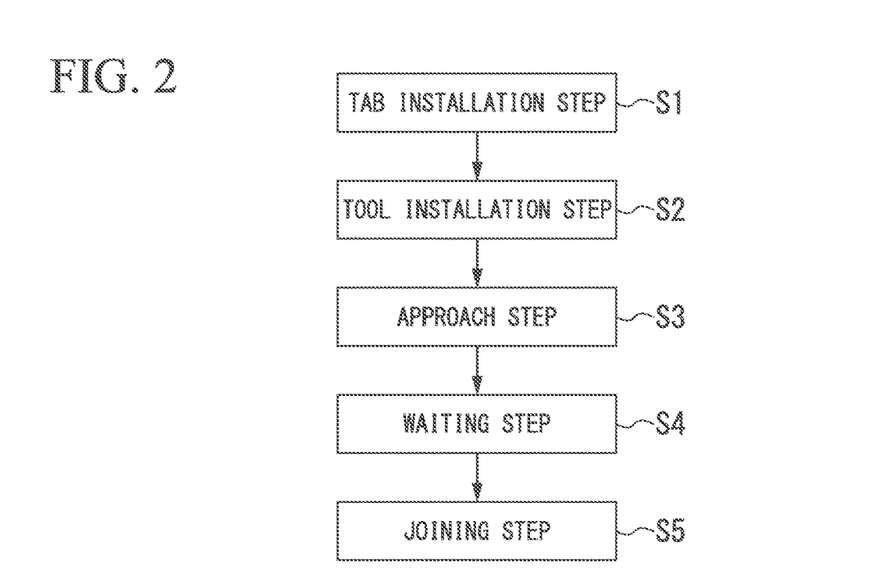
FIG. 2 is a flowchart for describing a procedure of the production method of the joint material according to the first embodiment of the present invention.

Next, as shown in FIG. 2, a procedure of a production method of the joint material 1 of this embodiment will be described.

The production method of this embodiment includes a tab installation step S1 of installing the end tab 20, a tool installation step S2 of installing the rotating tool 10 in the end tab 20 after the installing of the end tab 20, an approach step S3 of moving the rotating tool 10 on the end tab 20, a waiting step S4 of causing the rotating tool 10 to standby on the end tab 20 after the approach step S3, and a joining step S5 of joining the workpiece W after the waiting step S4.

First, the tab installation step S1 is performed. In other words, the first end surface 20*a* of the end tab 20 is caused to abut against the end surface Wa of the workpiece W and is fixed to a platen (not shown) using a clamp (not shown) or the like.

Subsequently, the tool installation step S2 is performed. In other words, the rotating tool 10 is caused to approach the end tab 20 from above the end tab 20, and the probe 12 is inserted and installed in the cutout portion 21. At this time, the shoulder surface 11*a* of the rotating tool 10 is brought into contact with the upper surface of the end tab 20.

Also, the approach step S3 is performed. In other words, the rotating tool 10 is moved toward the distal end side 22 of the cutout portion 21 while the surface of the end tab 20 is pressed by the shoulder surface 11*a* in a state in which the probe 12 is inserted into the cutout portion 21.

The waiting step S4 is performed. In other words, the distal end side 22 of the cutout portion 21 stops the rotating tool 10 from moving and allows the rotating tool 10 to standby. At this time, the rotating tool 10 is held at a position at which the probe 12 is not in contact with the bottom 21*a* of the cutout portion 21.

In the waiting step S4, the movement of the tool is stopped until a temperature of the workpiece W at a joining portion in front of the rotating tool 10 in the advancing direction D1 of the rotating tool 10 is a predetermined temperature or more.

The joining portion in front of the rotating tool 10 in the advancing direction D1 thereof indicates a portion on the joining line L near the end surface Wa of the workpiece W which is initially joined. The "joining portion in front of the rotating tool 10 in the advancing direction D1 thereof" may include at least a portion at which the end surface Wa and the joining line L cross each other.

In this embodiment, the above-described "predetermined temperature" is a temperature greater than or equal to 0.45 times and less than or equal to 0.8 times of a melting point of a material forming the workpiece W. For example, when the workpiece W is made of an aluminum material, a melting point thereof is about 660° C. Thus, the movement of the rotating tool 10 is stopped until the temperature of the joining portion is in a range of a temperature of 297° C. or more and 528° C. or less.

The temperature of the workpiece W can be calculated, for example, using a general method in which a thermocouple installed on the workpiece W is used or radiant heat or the like from the workpiece W is measured.

Finally, the joining step S5 is performed. In other words, the rotating tool 10 starts to move at a time at which the temperature of the workpiece W is the above-described predetermined temperature, the joining of the workpiece W is performed, and thus the joint material 1 is produced.

According to such a production method of the joint material 1, the end tab 20 in which the cutout portion 21 is formed is used and the distal end side 22 of the cutout portion 21 allows the rotating tool 10 to standby so that the rotating tool 10 is held in front of the joining line L before the workpiece W starts to be joined.

Therefore, the temperature of the workpiece W on the joining line L can be effectively increased to the predetermined temperature due to the standby of the rotating tool 10. Furthermore, the joining step S5 is performed in this state so that the workpiece W can be joined while occurrence of joining defects is suppressed at a time of joining, in particular, at a position of the end surface Wa of the workpiece W serving as a start end of the joining and thus the joint material 1 can be produced.

When the rotating tool 10 is allowed to standby, the movement of the rotating tool 10 can be regulated by the cutout portion 21 and thus the rotating tool 10 can be allowed to firmly standby on the extension line L1 of the joining line L. For this reason, the rotating tool 10 can be stably allowed to standby and held in front of the joining line L and thus the rotating tool 10 can be smoothly guided on the joining line L after waiting for a predetermined time.

The joining step S5 is performed at a time at which the workpiece W has a temperature greater than or equal to 0.45 times and less than or equal to 0.8 times of the melting point thereof so that the joint material 1 can be produced while occurrence of joining defects is further suppressed.

By using the production method of the joint material 1 of this embodiment, that is, using the end tab 20 in which the cutout portion 21 is formed, friction stir welding can be performed using a simple method while occurrence of joining defects at the end surface Wa joining start end (the end surface Wa) is suppressed.

In this embodiment, the thickness of the end tab 20 may be the same as the thickness of the workpiece W. In this case, the end tab 20 can be installed such that the surface of the end tab 20 is flush with the surface of the workpiece W and thus the workpiece W can be more smoothly joined.

Figure 3:
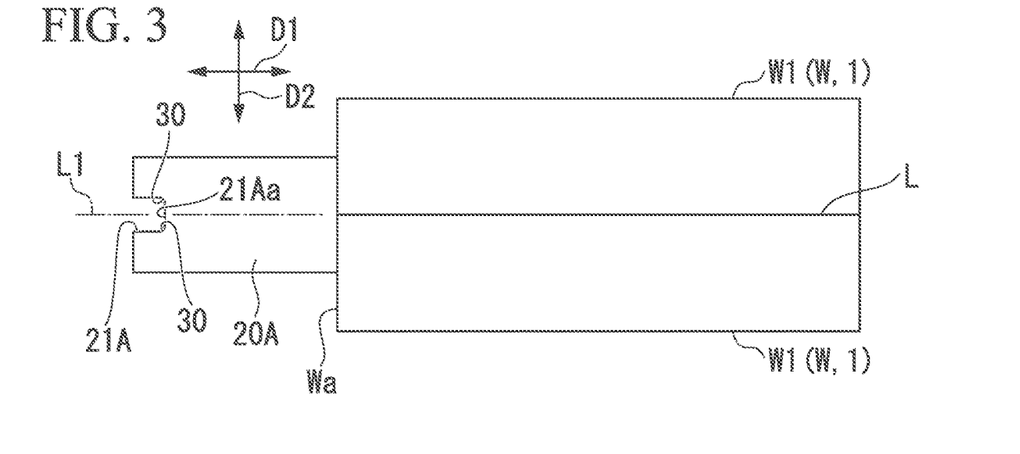
FIG. 3 is a top view showing a state in which an end tab of a first modified example used for the production method of the joint material according to the first embodiment of the present invention is installed at a workpiece.

As shown in FIG. 3, chamfered portions 30 may be formed by performing R chamfering or C chamfering on corners of a bottom 21Aa of a cutout portion 21A of an end tab 20A.

Figure 4:
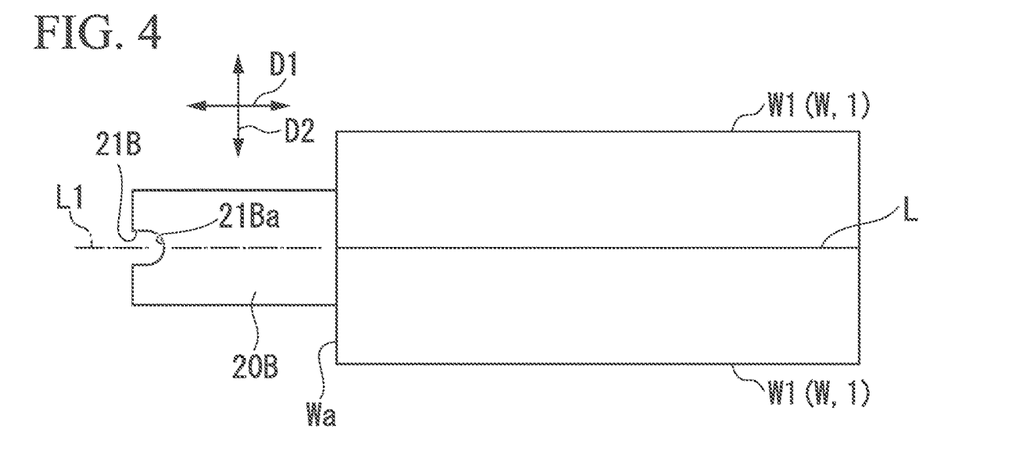
FIG. 4 is a top view showing a state in which an end tab of a second modified example used for the production method of the joint material according to the first embodiment of the present invention is installed at a workpiece.

As shown in FIG. 4, a cutout portion 21B of an end tab 20B may be formed in a semi-circular shape with the second end surface 20b as a diameter in a top view. In other words, the bottom 21B a of the cutout portion 21B may be an arc-shaped curved surface.

Figure 5:
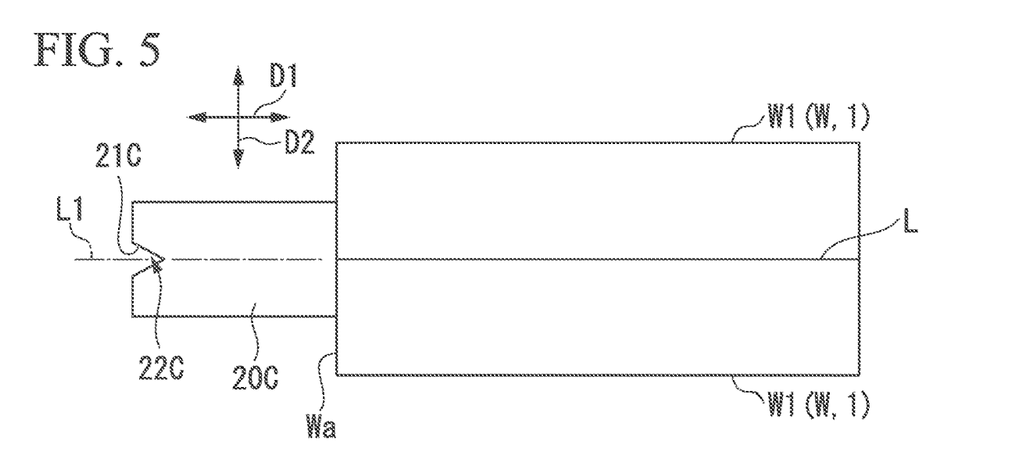
FIG. 5 is a top view showing a state in which an end tab of a third modified example used for the production method of the joint material according to the first embodiment of the present invention is installed at a workpiece.

As shown in FIG. 5, a cutout portion 21C of an end tab 20C may have a triangular shape in a top view. In other words, an end of a distal end side 22C of the cutout portion 21C may be a triangular vertex.

Figure 6:
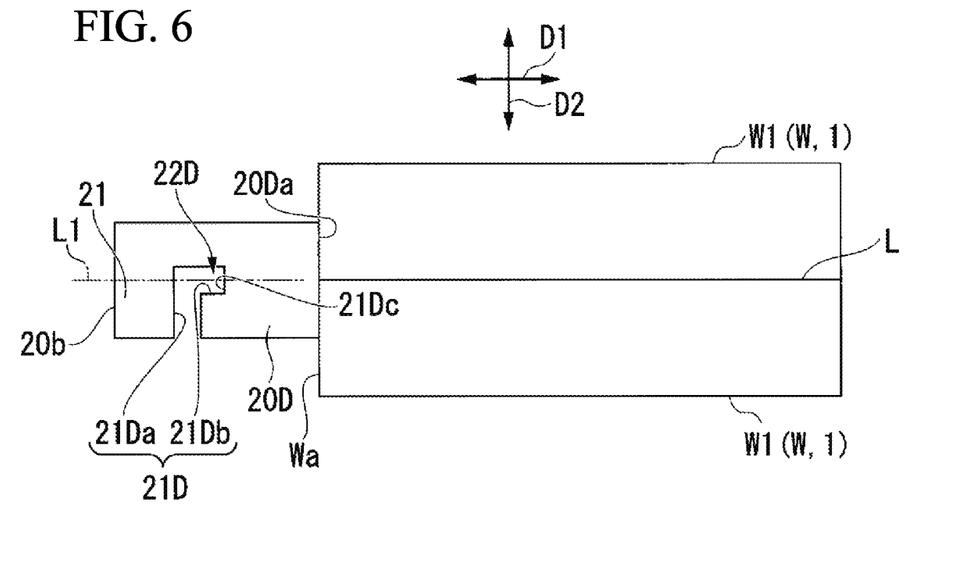
FIG. 6 is a top view showing a state in which an end tab of a fourth modified example used for the production method of the joint material according to the first embodiment of the present invention is installed at a workpiece.

As shown in FIG. 6, a cutout portion 21D of an end tab 20D may be formed to extend in the width direction D2 from a surface thereof facing one side of the end tab 20D in the width direction D2, be bent by 90°, and extend along the extension line L1. In other words, a crossing portion 21Da extending in the width direction D2 crossing the joining line L and a bent portion 21Db continuing to the crossing portion 21Da and bent from the crossing portion 21Da extending on the extension line L1 are formed in the cutout portion 21D.

The bent portion 21Db has the same shape as the cutout portion 21 shown in FIG. 1A and has a rectangular shape symmetrical with the width direction D2 about the extension line L1. In other words, the bent portion 21Db is formed on the extension line L1 and a distal end side 22D of the cutout portion 21D (a bottom 21Dc of the cutout portion 21D) is positioned on the extension line L1.

As described above, the crossing portion 21Da is formed so that, when a portion of the workpiece W softened due to rotation of the rotating tool 10 at the time of friction stir welding goes round at a joining start end in rear of the rotating tool 10, the softened workpiece W is blocked by the crossing portion 21Da. Thus, the softened workpiece W can be suppressed from being discharged and thus occurrence of joining defects can be suppressed and the joining can be further efficiently performed.

Figure 7:
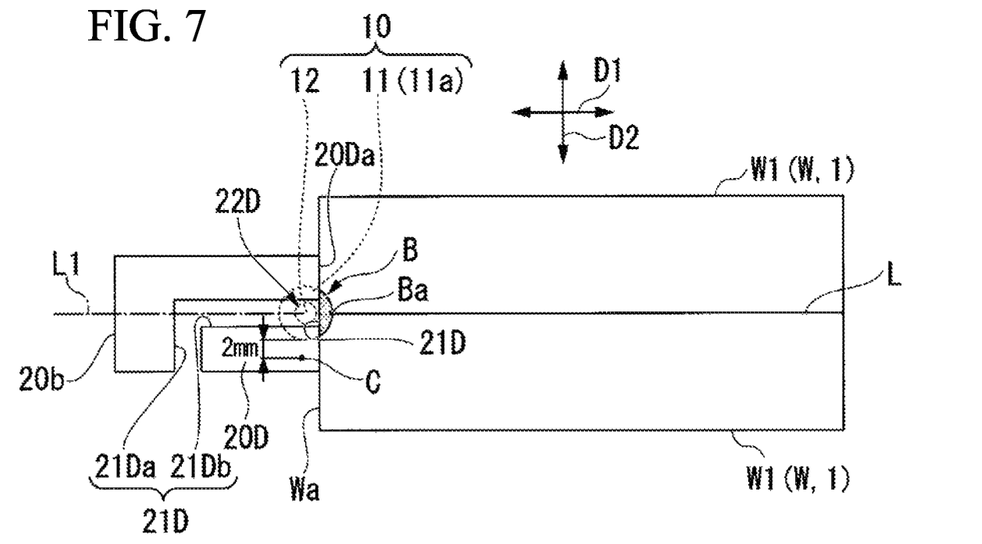
FIG. 7 is a top view showing a state in which an end tab of a fifth modified example used for the production method of the joint material according to the first embodiment of the present invention is installed at a workpiece.

As shown in FIG. 7, the bent portion 21Db may be formed to extend to a first end surface 20Da of the end tab 20D on the extension line L1. In other words, the bent portion 21Db is formed up to a position at which the distal end side 22D of the cutout portion 21D comes into contact with the end surface Wa of the workpiece W.

In this case, in the waiting step S4, the shoulder surface 11a comes into contact with a region of the workpiece W indicated by a portion B of FIG. 7 in a state in which the rotating tool 10 is allowed to standby. Thus, a contact area between the workpiece W and the rotating tool 10 can be increased and an amount of heat input from the rotating tool 10 to the workpiece W can be increased during the standby of the rotating tool 10. As a result, a temperature rise of the workpiece W can be quickened and a waiting time of the rotating tool 10 can be shortened. Thus, production efficiency of the joint material 1 can be improved.

In the waiting step S4, the movement of the rotating tool 10 may be stopped until the temperature of the workpiece W at a position Ba at which a leading edge (a leading end edge in the advancing direction D1) of the shoulder surface 11a crosses the joining line L is a predetermined temperature or more in a state in which the rotating tool 10 is allowed to standby. In other words, the "joining portion in front of the rotating tool 10 in the advancing direction D1 thereof" may include at least the position Ba.

Incidentally, as a method of indirectly determining the above-described "predetermined temperature" in the waiting step S4 described above, a method in which a thermocouple is installed at the end tab 20 at a position (for example, a point C of FIG. 7) which is 2 mm away from an edge of the shoulder surface 11a and it is determined whether a temperature at the point C is a temperature of 300° C. or more can be adopted. Furthermore, in the joining step S5, the rotating tool 10 is moved at a time at which the temperature at the point C is a temperature of 300° C. or more.

With such a constitution, the joint material 1 can be produced, particularly, while occurrence of joining defects at the joining start end of the workpiece W is suppressed.

The thermocouple may be installed at the position which is 2 mm away from the edge of the shoulder surface 11a on the workpiece W.

Figure 8:
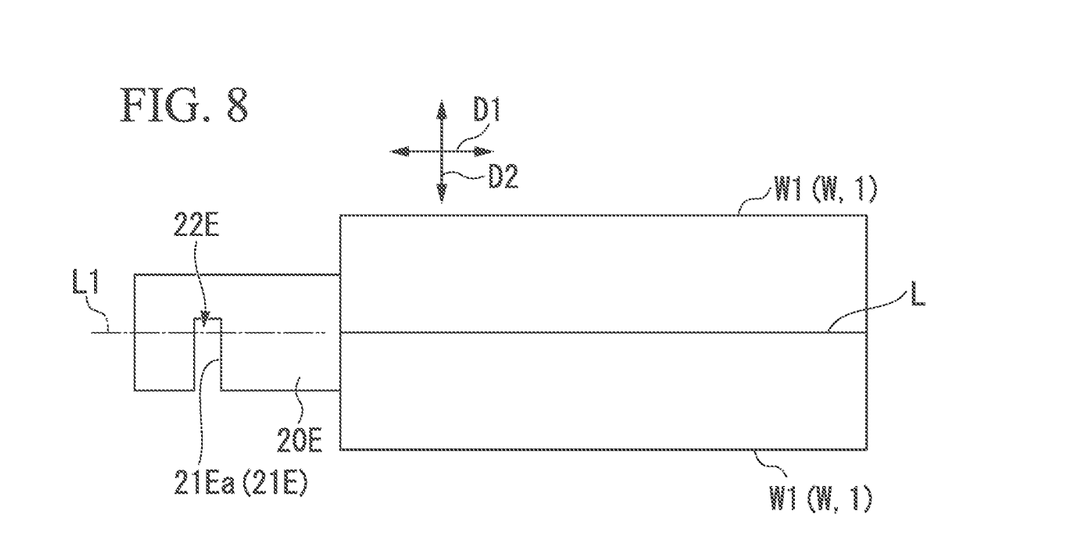
FIG. 8 is a top view showing a state in which an end tab of a sixth modified example used for the production method of the joint material according to the first embodiment of the present invention is installed at a workpiece.

As shown in FIG. 8, only a crossing portion 21Ea extending in the width direction D2 crossing the joining line L may be formed in a cutout portion 21E of an end tab 21E. The cutout portion 21E extends to a position on the extension line L1. As a result, a distal end side 22E of the cutout portion 21E is positioned on the extension line L1.

Also in a case shown in FIG. 8, as in the cases shown in FIGS. 6 and 7, when a portion of the softened workpiece W goes round at the joining start end in rear of the rotating tool 10, the softened workpiece W is blocked by the crossing portion 21Ea. Thus, the softened workpiece W can be suppressed from being discharged and thus occurrence of joining defects can be suppressed and the joining can be further efficiently performed.

Second Embodiment

Hereinafter, a production method of a joint material 51 of a second embodiment of the present invention will be described with reference to FIGS. 9 and 10.

Constituent elements which are the same as those of the first embodiment are denoted with the same reference numerals and detailed descriptions thereof will be omitted.

This embodiment and the first embodiment differ in that none of the above-described end tabs 20 (20A, 20B, 20C, 20D, and 20E) is used.

In other words, the production method of the joint material 51 in this embodiment includes the waiting step S4 and the joining step S5, which have been described above, a cutout step S11 of forming a cutout portion 61 in an end surface Wa of a workpiece W, and a tool installation step S21 of installing a probe 12 of a rotating tool 10 at the cutout portion 61.

First, the cutout step S11 is performed. In other words, the cutout portion 61 is formed on a joining line L in an advancing direction D1 from an end surface Wa of the workpiece W. The cutout portion 61 has the same shape as the cutout portion 21 shown in FIG. 1A of the first embodiment. In other words, the cutout portion 61 has a rectangular shape symmetrical with a width direction D2 about the joining line L. Furthermore, the cutout portion 61 extends up to a middle position of the workpiece W from the end surface Wa, and a distal end side 62 of the cutout portion 61 (a bottom 61a of the cutout portion 61) is positioned on the joining line L.

The cutout portion 61 is formed to be slightly larger than an outer diameter of the probe 12 to an extent to which the probe 12 is not in contact with an inner surface of the cutout portion 61 when the probe 12 is inserted through the cutout portion 61.

In the waiting step S4, an amount of heat input from the rotating tool 10 to the workpiece W is increased. Thus, the cutout portion 61 may be formed so that a contact area of a shoulder surface 11a with respect to the workpiece W is increased to be as large as possible in a state in which the probe 12 is inserted. In other words, the cutout portion 61 may be formed to extend in the advancing direction D1 such that the shoulder surface 11a is positioned on the workpiece W as a whole.

On the other hand, as will be described later, when a portion in which the cutout portion 61 is formed is cut after the joining step S5 is performed, the cutout portion 61 may be formed to be as short as possible in the advancing direction D1 to decrease an amount of cutting.

Subsequently, the tool installation step S21 is performed. In other words, as in the first embodiment, the rotating tool 10 is caused to approach the workpiece W from above the workpiece W and the probe 12 is inserted and installed in the cutout portion 61. At this time, the shoulder surface 11a of the rotating tool 10 is brought into contact with an upper surface of the workpiece W.

After that, the waiting step S4 and the joining step S5 are performed.

A step of cutting a position at which the cutout portion 21 is formed from the joint material 51 is performed after the joining step S5 is performed as necessary.

The rotating tool 10 is held at a start end position (a joining start end) of a joining line L using the production method of the joint material 51 in this embodiment, that is, by directly forming the cutout portion 61 in the workpiece W. Thus, a temperature of the workpiece W on the joining line L can be effectively increased to a predetermined temperature due to the standby of the rotating tool 10. The joining step S5 is performed in this state so that the joint material 51 can be produced while occurrence of joining defects is suppressed at a time of joining.

The cutout portion 61 is formed in the workpiece W so that movement of the rotating tool 10 can be regulated by the cutout portion 61. For this reason, the rotating tool 10 can be stably allowed to standby in front of the joining line L.

Figure 9:
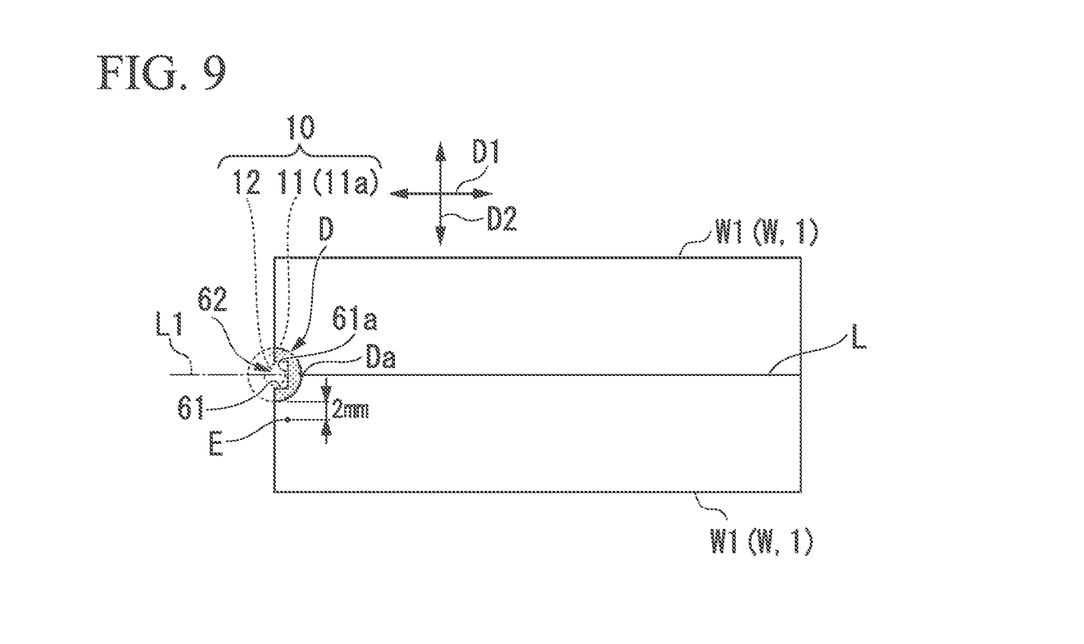
FIG. 9 is a top view showing a workpiece joined by a production method of a joint material according to a second embodiment of the present invention and a rotating tool installed at the workpiece.
Figure 10:
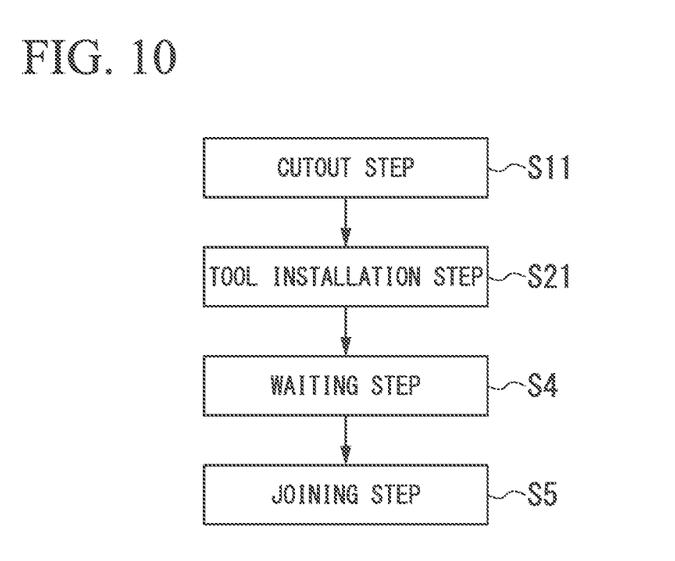
FIG. 10 is a flowchart for describing a procedure of the production method of the joint material according to the second embodiment of the present invention.

The cutout portion 61 directly formed in the workpiece W allows the rotating tool 10 to standby so that a contact area between the workpiece W and the rotating tool 10 can be increased during the standby of the rotating tool 10 (refer to a region in the workpiece W shown in a portion D of FIG. 9), and the amount of heat input from the rotating tool 10 to the workpiece W can be increased. As a result, a temperature rise of the workpiece W can be quickened and a waiting time of the rotating tool 10 can be shortened. Thus, production efficiency of the joint material 51 can be improved.

With such a constitution, also in this embodiment, as in the first embodiment, friction stir welding can be performed using a simple method while occurrence of joining defects at the joining start end is suppressed.

With regard to the "predetermined temperature" in the waiting step S4, as in the first embodiment, a temperature greater than or equal to 0.45 times and less than or equal to 0.8 times of a melting point of a material forming the workpiece W may be set as a criterion. Furthermore, a thermocouple is installed at the workpiece W at a position (for example, a point E of FIG. 9) which is 2 mm away from an edge of the shoulder surface 11a, and whether a temperature at the point D is a temperature of 300° C. or more may be set as a criterion.

Also in this embodiment, the cutout portions 21 (21A, 21B, 21C, 21D, and 21E) of various shapes which have been described in the first embodiment can be adopted. In addition, shapes of a cutout portion are not limited.

Also in this embodiment, as in the case shown in FIG. 7 of the first embodiment, the "joining portion in front of the rotating tool 10 in the advancing direction D1 thereof" described above may include at least a position Da at which a leading edge (a leading end edge in the advancing direction D1) of the shoulder surface 11a crosses the joining line L.

Third Embodiment

Figure 11:
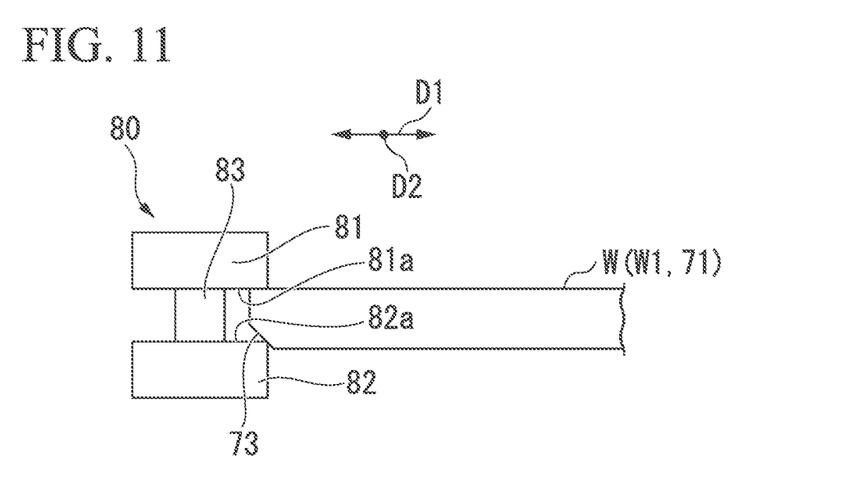
FIG. 11 is a top view showing a workpiece joined by a production method of a joint material according to a third embodiment of the present invention and a rotating tool installed at the workpiece.
Figure 12:
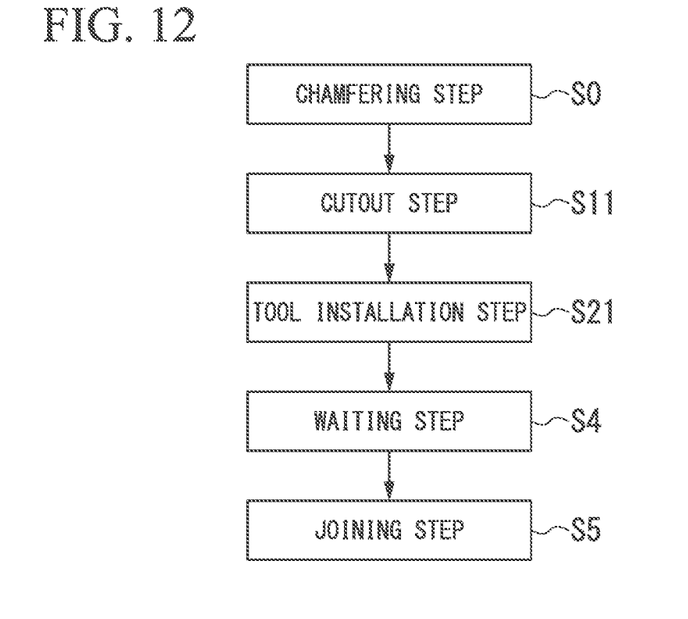
FIG. 12 is a flowchart for describing a procedure of the production method of the joint material according to the third embodiment of the present invention.

Hereinafter, a production method of a joint material 71 of a third embodiment of the present invention will be described with reference to FIGS. 11 and 12.

Constituent elements which are the same as those of the first and second embodiments are denoted with the same reference numerals and detailed descriptions thereof will be omitted.

The production method of the joint material 71 in this embodiment further includes a chamfering step S0 of forming a chamfered portion 73 on an end surface Wa of a workpiece W in addition of the production method of the second embodiment.

Also, in the case of a rotating tool 80 in this embodiment, an upper shoulder 81 (a first shoulder) with an upper shoulder surface 81a is coupled to a lower shoulder 82 (a second shoulder) with a lower shoulder surface 82a using a probe 83. The rotating tool 80 is a bobbin tool configured to perform joining to sandwich the workpiece W using the upper shoulder 81 and the lower shoulder 82.

The chamfering step S0 is performed before the joining step S5. In this embodiment, for example, the chamfering step S0 is performed before the cutout step S11. Note that the chamfering step S0 may be performed after the cutout step S11.

In the chamfering step S0, the chamfered portion 73 is formed at an end edge at a rear surface side of the workpiece W in the end surface Wa of the workpiece W, that is, an end edge at the lower shoulder surface 82a side. The chamfered portion 73 is formed using R chamfering or C chamfering.

Using the production method of the joint material 71 in this embodiment, even if a distance between the upper shoulder surface 81a and the lower shoulder surface 82a of the rotating tool 80 serving as a so-called bobbin tool is smaller than a plate thickness of the workpiece W, the rotating tool 80 is not caught by the end surface Wa of the workpiece W. In other words, the lower shoulder 82 of the rotating tool 80 can move to slide on the chamfered portion 73. Thus, the joining using the bobbin tool can be easily performed, and thus occurrence of joining defects on the end surface Wa of the workpiece W due to the catching of the bobbin tool can be suppressed.

In this embodiment, although the chamfered portion 73 is formed at the end edge at the lower shoulder 82 side, the chamfered portion 73 may be formed at an end edge at the upper shoulder 81 side. Furthermore, chamfered portions may be formed at end edges at the upper shoulder 81 side and the lower shoulder 82 side.

Even if the end tab 20 is used as in the first embodiment, the chamfering step S0 of this embodiment can be applied. In this case, the chamfering step S0 is performed, for example, before the tab installation step S1.

Although the embodiments of the present invention have been described in detail above, some changes in design are also possible without departing from the technical idea of the present invention.

Figure 13:
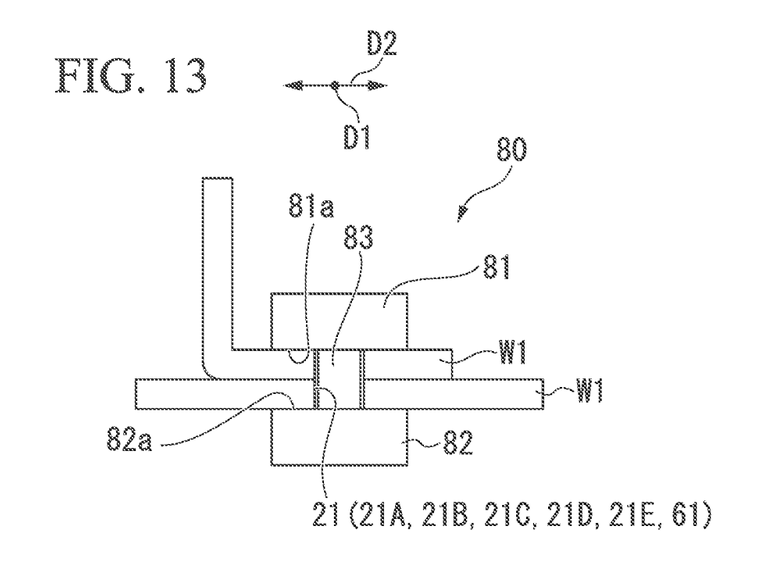
FIG. 13 is a front view showing a workpiece joined by a production method of a joint material according to a modified example of the embodiment of the present invention and a rotating tool installed at the workpiece.

For example, as shown in FIG. 13, even when two plates W1, which overlap each other, of the workpiece W are joined using the rotating tool 80 serving as the bobbin tool, the cutout portions 21 (21A, 21B, 21C, 21D, 21E, and 61) in the above-described embodiments can be applied.

Also in the first and second embodiments, the rotating tool 80 of the third embodiment, that is, the bobbin tool, may be used instead of the rotating tool 10.

INDUSTRIAL APPLICABILITY

According to the end tab for friction stir welding and the production method of the joint material using the friction stir welding which have been described above, friction stir welding can be performed using a simple method while occurrence of joining defects at a joining start end is suppressed.

REFERENCE SIGNS LIST 1, 51, 71 Joint material
10, 80 Rotating tool
11 Shoulder
11a Shoulder surface
12 Probe
20, 20A, 20B, 20C, 20D, 20E End tab
20a, 20Da First end surface
20b Second end surface
21, 21A, 21B, 21C, 21D, 21E, 61 Cutout portion
21a, 21Aa, 21Ba, 21Dc, 61a Bottom
22, 22C, 22D, 22E, 62 Distal end side
21Da, 21Ea Crossing portion
21Db Bent portion
30 Chamfered portion
D1 Advancing direction
D2 Width direction
L Joining line
L1 Extension line
S0 Chamfering step
S1 Tab installation step
S2 Tool installation step
S3 Approach step
S4 Waiting step
S5 Joining step
S11 Cutout step
S21 Tool installation step
73 Chamfered portion
81 Upper shoulder (first shoulder)
81a Upper shoulder surface
82 Lower shoulder (second shoulder)
82a Lower shoulder surface
83 Probe
W Workpiece
W1 Plate material
Wa End surface

The invention claimed is:

1. A welding method comprising:
a tab installation step of installing an end tab on a pair of workpieces to be joined at a joining line therebetween by friction stir welding, in which the end tab includes:
a body;
a first end surface formed on one end of the body with respect to a longitudinal direction of the body;
a second end surface formed on the other end of the body; and
a cutout portion comprising an opening formed on a first side surface of the body with respect to a width direction of the body so as to extend from the first side surface and a portion extending 90° from the opening towards the first end surface, wherein the portion extends along an extension line of the end tab in the longitudinal direction,
wherein the end tab is installed on the workpieces such that the first end surface abuts an end surface of the pair of workpieces at the joining line while the extension line of the tab aligns with the joining line of the workpieces,
a tool installation step of installing a tool for friction stir welding at the cutout portion;
an approach step of moving the tool, while the tool is rotating from the opening to the portion;
a waiting step of causing the tool for friction stir welding to standby in the cutout portion at the extension line; and
a joining step of starting movement of the tool along the joining line at a time at which a temperature of the workpieces at a joining portion in front of the tool in an advancing direction of the tool in the waiting step is a predetermined temperature or more and welding the workpieces with each other.

2. The welding method according to claim 1, wherein, in the joining step, as the predetermined temperature, the tool starts the movement at a time at which a temperature of the workpieces is greater than or equal to 0.45 times and less than or equal to 0.8 times of a melting point of the workpieces.

3. The welding method according to claim 1, wherein, as the tool, a bobbin tool is configured to perform welding such that the workpieces are sandwiched using a first shoulder and a second shoulder is used, and the welding method further comprises:
a chamfering step of forming a chamfered portion on at least one edge of the end surface of the workpieces before the joining step.

* * * * *